(12) United States Patent
Strassberger

(10) Patent No.: US 12,373,087 B2
(45) Date of Patent: Jul. 29, 2025

(54) COUPLING OF USER INTERFACES

(71) Applicant: Bayerische Motoren Werke Aktiengesellschaft, Munich (DE)

(72) Inventor: Markus Strassberger, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/594,709

(22) PCT Filed: Jun. 5, 2020

(86) PCT No.: PCT/EP2020/065617
§ 371 (c)(1),
(2) Date: Oct. 27, 2021

(87) PCT Pub. No.: WO2021/004708
PCT Pub. Date: Jan. 14, 2021

(65) Prior Publication Data
US 2022/0197457 A1   Jun. 23, 2022

(30) Foreign Application Priority Data

Jul. 5, 2019   (DE) ...................... 10 2019 118 189.5

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06V 20/597* (2022.01);
(Continued)

(58) Field of Classification Search
CPC .... G06F 3/0484; G06F 3/0481; G06V 20/597
See application file for complete search history.

(56) References Cited

U.S. PATENT DOCUMENTS 9,694,682 B2 * 7/2017 Boss ................... G06F 3/04847
10,251,034 B2   4/2019 Langlois et al.
(Continued)

FOREIGN PATENT DOCUMENTS

CN   104750379 A   7/2015
CN   108205731 A   6/2018
(Continued)

OTHER PUBLICATIONS

International Search Report (PCT/ISA/210) issued in PCT Application No. PCT/EP2020/065617 dated Aug. 25, 2020 with English translation (six (6) pages).

(Continued)

*Primary Examiner* — William L Bashore
*Assistant Examiner* — Gregory A Distefano
(74) *Attorney, Agent, or Firm* — Crowell & Moring LLP

(57) ABSTRACT

A method and system couples a first user interface with a second user interface. The first user interface is implemented in the form of a mobile terminal or one or more back-end components. The second user interface is implemented in the form of a control device of a vehicle. The method includes the steps of: registering one or more elements of the first user interface; determining one or more display elements based on first heuristics and the one or more elements, wherein the one or more display elements are configured to reproduce at least one portion of the one or more elements; and displaying the one or more display elements on the second user interface. The system has the control device and/or the one or more back-end components, wherein the control device and/or the one or more back-end components are configured to carry out the method.

8 Claims, 3 Drawing Sheets

(51) Int. Cl.
*G06V 20/59* (2022.01)
*B60K 35/00* (2006.01)
*B60K 35/28* (2024.01)
*B60K 35/85* (2024.01)

(52) U.S. Cl.
CPC .............. *B60K 35/00* (2013.01); *B60K 35/28* (2024.01); *B60K 35/85* (2024.01); *B60K 2360/164* (2024.01); *B60K 2360/166* (2024.01); *B60K 2360/586* (2024.01); *B60K 2360/589* (2024.01)

(56) References Cited

U.S. PATENT DOCUMENTS

| | | | |
|---|---|---|---|
| 2008/0275632 A1* | 11/2008 | Cummings | G06F 3/0481 715/810 |
| 2009/0284476 A1 | 11/2009 | Bull et al. | |
| 2010/0293462 A1 | 11/2010 | Bull et al. | |
| 2013/0106750 A1 | 5/2013 | Kurosawa | |
| 2013/0157607 A1 | 6/2013 | Paek et al. | |
| 2013/0275899 A1* | 10/2013 | Schubert | H04M 1/72463 715/765 |
| 2013/0335401 A1 | 12/2013 | Beckmann | |
| 2014/0019913 A1* | 1/2014 | Newman | G06F 3/0488 715/810 |
| 2014/0106726 A1 | 4/2014 | Crosbie et al. | |
| 2014/0179274 A1 | 6/2014 | O'Meara et al. | |
| 2014/0181715 A1 | 6/2014 | Axelrod et al. | |
| 2014/0181751 A1* | 6/2014 | Won | G06F 3/04817 715/835 |
| 2014/0359456 A1* | 12/2014 | Thiele | H04W 4/18 715/735 |
| 2015/0019967 A1 | 1/2015 | Gutentag et al. | |
| 2016/0009175 A1* | 1/2016 | McNew | G01C 21/3652 340/438 |
| 2018/0173230 A1 | 6/2018 | Goldman-Shenhar et al. | |
| 2019/0308639 A1* | 10/2019 | Ricci | H04W 12/06 |
| 2020/0241824 A1* | 7/2020 | Lee | G06F 3/017 |
| 2020/0290630 A1* | 9/2020 | Elwart | B60W 40/08 |

FOREIGN PATENT DOCUMENTS

| | | |
|---|---|---|
| DE | 10 2009 048 178 A1 | 4/2011 |
| DE | 10 2011 112 445 A1 | 9/2012 |
| DE | 10 2013 221 867 A1 | 4/2015 |
| DE | 10 2014 017 173 A1 | 5/2016 |
| DE | 10 2018 129 801 A1 | 5/2020 |
| WO | WO 2005/004431 A2 | 1/2005 |
| WO | WO 2005/055046 A1 | 6/2005 |

OTHER PUBLICATIONS

German-language Written Opinion (PCT/ISA/237) issued in PCT Application No. PCT/EP2020/065617 dated Aug. 25, 2020 (seven (7) pages).

German-language Office Action issued in German Application No. 10 2019 118 189.5 dated Apr. 28, 2020 (five (5) pages).

Chinese-language Office Action issued in Chinese Application No. 202080034220.X dated Jun. 22, 2024 with English translation (16 pages).

Chinese-language Office Action issued in Chinese Application No. 202080034220.X dated Feb. 5, 2024 with English translation (19 pages).

* cited by examiner

COUPLING OF USER INTERFACES

BACKGROUND AND SUMMARY OF THE INVENTION

The disclosure relates to a system and to a method for coupling user interfaces to user interfaces in vehicles. The disclosure relates in particular to a system and to a method for automatic, intelligent coupling of user interfaces, for example of mobile terminals or cloud-based systems, to user interfaces in vehicles.

The prior art discloses various systems that make it possible to couple mobile terminals to the infotainment system of a vehicle. "CarPlay" offered by Apple for example provides the option to operate an Apple smartphone in a restricted manner via the infotainment system of a vehicle, and thus for example to enable navigation, the sending and receiving of messages and the playing of music. In this case, just as with the similarly functioning "Android Auto", offered by Google for smartphones based on the Android operating system, a user interface that is specifically developed for each app to be used and adapted or limited in terms of operating and display functions is displayed on the infotainment system of the vehicle. Another similarly functioning product is "Mirror Link".

Automatic support for apps that are not specifically developed for operation by means of CarPlay or Android Auto or Mirror Link is not provided. Third-party suppliers are permitted to develop appropriate operating concepts for their own apps. However, the option of integrating an app that has been produced by third-party suppliers into one of the aforementioned systems requires approval by the respective producer, typically in order to minimize distraction of the driver and to decide whether an app may be activated at all during driving operation.

Individual adaptation for integration into a respective infotainment system and corresponding checking or approval of each individual app is very complex, costly and time-intensive. Individual adaptation also typically has to be carried out in relation to the integration system used (for example CarPlay) and the corresponding infotainment system, with the latter being able to be implemented very differently from vehicle manufacturer to vehicle manufacturer.

U.S. 2013/0106750 A1 describes a system and a method by way of which a user device can be coupled to a vehicle-based computer system. In this case, the screen contents of the user device are mirrored on a touchscreen of the computer system and inputs performed by the driver using the touchscreen are transmitted to the user device. Remote control of the user device is realized by way of the touchscreen. The systems and methods require that the apps used are approved for use. Distraction of the driver, which can arise due to the use of the system, is not taken into account. The operating concept is not adapted for application in the vehicle but instead is passed through "one-to-one".

U.S. Pat. No. 10,251,034 B2 likewise describes a system and a method by way of which a user device can be coupled to a vehicle-based computer system, wherein provision is expressly made for specific elements of the display to be faded out or not displayed in order not to overload the display and possibly distract the user too much. In this case, specific events on the part of the user device (for example based on sensor data or operating conditions of the user device) are assumed in order to display individual elements. For example, provision is thus made for a state of charge display of the user device to be displayed on the vehicle information system only when the state of charge reaches a predetermined minimum. Potential distraction of the driver is not taken into account beyond this. In particular, provision is not made for vehicle-based events to be taken into account.

U.S 2015/0019967 A1 likewise describes a system and a method by way of which a user device can be coupled to a vehicle-based computer system in the form of a live link. The described systems and method can where necessary completely hide the display of a user device if the situation so requires, for example in the event of a full braking of the vehicle by the driver. Manually hiding the display, for example by way of a front-seat passenger, is likewise provided.

Until now, a system or method that registers and processes the user interface of any apps that are executed on a mobile terminal of a user or in a cloud-based manner in such a way that the driver can also use them during the journey without significant distraction has not been known.

In relation to cloud-based systems, a system or method that registers and processes an appropriate user interface, for example in a similar manner to websites or known interfaces of software for desktop systems, in such a way that the driver can also use them during travel without significant distraction has not been known either. While there are still a relatively large number of restrictions, which span manufacturers too, in the case of user interfaces for mobile terminals (for example screen size, operating elements, interaction options), further or other restrictions for cloud-based systems also have to be taken into account.

Furthermore, until now, a system or method that registers and processes the user interface of cloud-based systems in such a way that the driver of a vehicle can use them by means of a display or operating system (for example infotainment, iDrive, gesture control, voice input, touchscreen) present in the vehicle, in particular even during the journey and without significant distraction of the driver, has not been known.

There is therefore the need for systems and methods that register the user interface of any apps that are executed on a mobile terminal of a user or cloud-based systems, preferably essentially in real time, process registered content and provide an adapted display of the content, with the adapted display preventing or minimizing potential distraction of the driver.

There is therefore the need in particular for systems and methods that check any operating elements that are provided on a respective user interface of an app executed on a mobile terminal of a user or cloud-based systems for potential distraction of the driver and possibly provide the same for input where necessary and while minimizing distraction of the driver in a suitable manner. This can involve in particular the fading out of one or more input elements and/or modification and, where necessary, fading in of one or more input elements (for example in enlarged form and/or at predetermined locations of the displayed user interface).

There is the need in particular for systems and methods that register inputs made by a user and transmit same to a respective app executed on a mobile terminal of a user or to cloud-based systems so that transparent use of the app or the cloud-based system for the user is made possible.

There is the need in particular for systems and methods that reduce the dynamics of the possible dynamic elements that are present on a user interface of an app executed on a mobile terminal of a user or cloud-based systems or convert same to essentially static elements and/or output registered dynamics based on a current driving situation of the vehicle to the user, where necessary statically or with reduced or minimized dynamics. This can also involve a display of elements of the user interface with a time offset.

DISCLOSURE OF THE INVENTION

It is an object of the present disclosure to provide methods and systems that prevent one or more of the described disadvantages and/or make possible one or more of the described advantages.

This object is achieved by the subject matter of the independent claims. Advantageous configurations are specified in the dependent claims.

In a first aspect according to embodiments of the present disclosure, a method for coupling a first user interface to a second user interface is specified. The first user interface is implemented by way of a mobile terminal or by way of one or more back-end components and the second user interface is implemented by way of a control device of a vehicle. The method comprises registering one or more elements of the first user interface; determining one or more display elements based on first heuristics and the one or more elements, wherein the one or more display elements are configured to depict at least some of the one or more elements; and displaying the one or more display elements on the second user interface.

In a second aspect according to aspect 1, the first heuristics further comprise relevance-based heuristics for transferring the one or more elements to the one or more display elements, wherein the relevance-based heuristics correlate a relevance of at least one of the one or more elements with one or more display parameters of the depiction; preferably wherein the relevance-based heuristics take into account a current relevance of the one or more for a user of the vehicle.

In a third aspect according to one of aspects 1 or 2, the first heuristics further comprise dynamics-based heuristics for transferring the one or more elements to one or more display elements, wherein the dynamics-based heuristics correlate display dynamics of at least one of the one or more elements with one or more display parameters of the depiction. Preferably, the dynamics-based heuristics take into account a current driving state of the vehicle.

In a fourth aspect according to one of aspects 1 to 3, the first heuristics further comprise parameter-based heuristics for transferring one or more parameters of the first user interface to one or more parameters of the second user interface. Preferably, the parameter-based heuristics take into account generic depiction rules of the display of the one or more elements on the second user interface.

In a fifth aspect according to one of aspects 1 to 4, the method further comprises registering one or more inputs of a user of the vehicle; determining an input image of the one or more inputs based on second heuristics; and transmitting the input image to the first user interface.

In a sixth aspect according to aspect 5, the second heuristics further comprise input-modal heuristics for depicting the one or more inputs of the user on input modalities of the first user interface.

In a seventh aspect according to one of aspects 5 or 6, the steps of registering one or more inputs, of determining the input image, and of transmitting the input image to the first user interface are carried out essentially in real time.

In an eighth aspect according to one of aspects 1 to 7, the steps of registering the one or more elements, of determining one or more display elements and of displaying the one or more display elements on the second user interface are carried out essentially in real time.

In a ninth aspect according to one of aspects 1 to 8, the method further comprises, preferably repeatedly at regular intervals, substantially continuously, or when required: registering one or more behavior parameters, which characterize a behavior of one or more users of the vehicle; and determining one or more attention parameters, which characterize a degree of attention of the one or more users relating to the operation of the vehicle, based on the behavior parameters.

In a tenth aspect according to the preceding aspect 9, the method further comprises adjusting the first and/or second heuristics based on the determined one or more attention parameters.

In an eleventh aspect, a system for coupling a first user interface to a second user interface is specified. The system comprises a control device; and/or one or more back-end components. The control device and/or the one or more back-end components are configured to execute the presently disclosed method, in particular according to one of aspects 1 to 10.

In a twelfth aspect, a vehicle comprising a control device is specified. The control device is configured to execute one or more steps, preferably all of the steps, of the presently disclosed method, in particular according to one of aspects 1 to 10.

According to a further aspect, a software program is described. The software program can be set up to be executed on a processor and thereby to execute presently disclosed methods.

According to a further aspect, a storage medium is described. The storage medium can comprise a software program, which is set up to be executed on a processor and thereby to execute presently disclosed methods.

The systems and methods disclosed here afford one or more of the advantages stated below.

Systems and methods according to the present disclosure make it possible to register user interfaces of any apps that are executed on a mobile terminal of a user or cloud-based systems essentially in real time, wherein registered content is processed, and an adapted display of the content is provided. The adapted display can prevent or minimize potential distraction of the driver. It is thus possible to enable operation of generic apps or cloud-based systems while at the same time preventing or minimizing distraction of the user. This can increase both the quality of the use of apps of mobile terminals or cloud-based systems in the vehicle as well as road safety.

Systems and methods according to the present disclosure also make it possible to check any operating elements that are provided on a respective user interface of an app executed on a mobile terminal of a user or cloud-based systems for potential distraction of the driver and possibly provide same for input where necessary and while minimizing distraction of the driver in a suitable manner. For example, fading out one or more input elements and/or modifying and, where necessary, fading in one or more input elements (for example in enlarged form and/or at predetermined locations of the displayed user interface) can reduce the complexity of the input process and/or control an input process where necessary. This can increase both the quality of the use of apps of mobile terminals or cloud-based systems in the vehicle as well as road safety.

Systems and methods according to the present disclosure also make it possible to register the inputs made by a user and transmit same to a respective app executed on a mobile terminal of a user or to a cloud-based system so that transparent use of the app or the cloud-based system for the user is made possible. This can increase the quality of the use of apps of mobile terminals or cloud-based systems in the vehicle and contribute to a range of apps or cloud-based systems that can be operated by means of an infotainment system present in the vehicle being able to be increased.

Systems and methods according to the present disclosure also make it possible to reduce the dynamics of possible dynamic elements that are present on a user interface of an app executed on a mobile terminal of a user or cloud-based systems or convert same to essentially static elements and/or output registered dynamics based on a current driving situation of the vehicle to the user, where necessary statically or with reduced or minimized dynamics. In particular, a display of elements of the user interface with a time offset can also be made possible. This can significantly improve traffic safety, in particular through moving display or input processes to situations in which only a very low degree of attention of the driver is necessary for driving the vehicle.

Exemplary embodiments of the disclosure are illustrated in the figures and are described in more detail below.

BRIEF DESCRIPTION OF THE DRAWINGS

Unless indicated otherwise, the same reference signs are used below for identical and functionally identical elements.

DETAILED DESCRIPTION OF THE DRAWINGS

Figure 1:
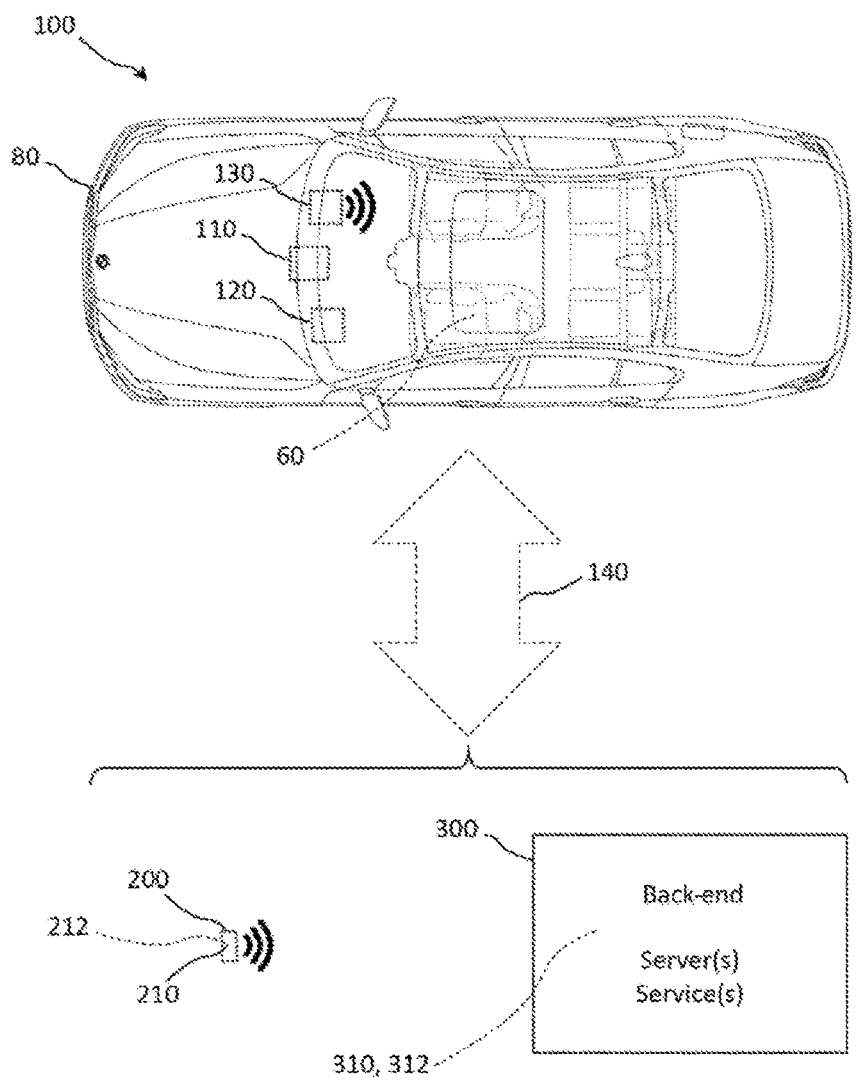
FIG. 1 schematically illustrates the interaction of individual components of a system for coupling a first user interface to a second user interface according to embodiments of the present disclosure.

FIG. 1 schematically illustrates the interaction of individual components of a system 100 for coupling a user interface 210, 310 to a user interface 110 in a vehicle 80 according to embodiments of the present disclosure. When reference is made in the present disclosure to a user 60, this includes in principle all users 60, including a user who can act as driver, a user who can act as front-seat passenger (for example located next to the driver) or a user who can act as passenger (for example located on a seat of the vehicle 80). Unless the following text expressly deals with a different treatment of individual user types, the term "user" is to be understood as any user 60.

The term "coupling" of user interfaces within the context of the present disclosure comprises a connection of a first user interface 210, 310 to a second user interface so that information (for example graphic representations, images, photos, audio, video) transmitted via the first user interface is transmitted to the second user interface 110 for the purpose of display by way of same and/or so that inputs (for example by way of touchscreen, gestures, voice inputs, by means of various operating elements) performed by a user 60 of the vehicle 80 by means of the second user interface 110 are transmitted to the first user interface 210, 310 for the purpose of processing by way of same. According to the invention, such a coupling permits the operation of different applications via the second user interface 110 (which is implemented for example by way of a control device 120 in a vehicle 80), wherein the applications are originally provided for operation via the first interface (which is implemented for example by way of a mobile terminal 200 or one or more back-end components 300). In this case, the second interface 110 is not directly implemented by the mobile terminal 200 or the one or more back-end components 300 (for example in case of cloud-based applications), that is to say a respective application is not provided for operation by means of the second interface. According to the invention, provision is furthermore made for the display and/or the inputs to be adapted in such a way that a degree of attention of the user 60 of the vehicle 80 (for example regarding the traffic, the driving of the vehicle and/or the operation of the vehicle) is not or is only minimally impaired and/or that various modalities of the input in the vehicle 80 are transmitted correctly or usefully in semantic terms to the first user interface.

The term "vehicle" comprises automobiles, trucks, buses, RVs, motorcycles, etc. used to transport people, goods, etc. In particular, the term comprises motor vehicles for transporting people. Vehicles 80 with an electric drive (in particular hybrid or electric vehicles) are driven by an electric motor and comprise one or more electrical energy stores (for example batteries, high-voltage stores), which can be connected to a charging station by way of a charging apparatus of the vehicle and charged. Various charging techniques can be used to charge the electrical stores of such hybrid or electric vehicles.

The vehicle preferably comprises an ambient sensor system (not illustrated in FIG. 1), which is configured to register environmental or ambient data that characterize surroundings and/or objects in the surroundings of the vehicle 80. The ambient sensor system preferably comprises at least one LiDAR system and/or at least one radar system and/or at least one camera and/or at least one ultrasound system. The ambient sensor system can provide environmental parameters based on ambient data, which characterize an ambient region of the vehicle.

Within the context of the present disclosure, the term "automated driving" can be understood to mean driving with automated longitudinal or transverse guidance or autonomous driving with automated longitudinal and transverse guidance. Automated driving can be for example driving for a relatively long time on the freeway or driving for a limited time while parking or maneuvering. The term "automated driving" covers automated driving with an arbitrary level of automation. Illustrative levels of automation are assisted, semiautomated, highly automated or fully automated driving. These levels of automation were defined by the German Federal Highway Research Institute (BASt) (see BASt publication "Forschung kompakt", issue 11/2012). In the case of assisted driving, the driver performs the longitudinal or transverse guidance on an ongoing basis, while the system undertakes the respective other function within certain boundaries. In the case of semiautomated driving (TAF), the system undertakes the longitudinal and transverse guidance for a certain period of time and/or in specific situations, the driver needing to monitor the system on an ongoing basis as in the case of assisted driving. In the case of highly automated driving (HAF), the system undertakes the longitudinal and transverse guidance for a certain period of time without the driver needing to monitor the system on an ongoing basis; however, the driver must be capable of taking over vehicle guidance within a certain time. In the case of fully automated driving (VAF), the system can automatically cope with driving in all situations for a specific application;

a driver is no longer needed for this application. The aforementioned four levels of automation correspond to SAE levels 1 to 4 of SAE standard J3016 (SAE—Society of Automotive Engineering). By way of example, highly automated driving (HAF) corresponds to level 3 of SAE standard J3016. Furthermore, SAE standard J3016 also has provision for SAE level 5 as the highest level of automation, which is not included in the definition from the BASt. SAE level 5 corresponds to driverless driving, in which the system can automatically cope with all situations throughout the entire journey in the same way as a human driver; a driver is generally no longer needed.

The system 100 can essentially be implemented on a control device 120 of the vehicle 80 and/or on one or more back-end components 300 (for example servers, services).

In addition to the control device 120, the vehicle 80 furthermore comprises a communication unit 130 that is configured for data communication 140 with components (for example back-end 300) external to the vehicle 80, and a user interface 110 that may be implemented for example as a touchscreen in the vehicle 80 (for example on or in the dashboard region of the vehicle 80 or as part of a rear-seat entertainment system in the back of the vehicle 80; not shown). The communication unit 130 may furthermore be configured so as to provide a data connection to mobile terminals 200, in particular to those that are located in the vehicle 80 and/or in the surroundings of the vehicle 80 and/or are used by the user 60. The data connection 140 can generally relate to the mobile terminal 200 and/or to a data connection to one (or more) app 212 executed on the mobile terminal and/or to a user interface 210 implemented on the mobile terminal 200. The communication unit 130 may furthermore be configured so as to provide a data connection 140 to one or more cloud-based services, in particular to those that are located in the vehicle 80 and/or are located in the surroundings of the vehicle 80 and/or are used by the user 60. The data connection 140 can generally relate to one or more cloud-based services 312 and/or to a data connection to a user interface 310 implemented by one or more cloud-based services 312. Individual components of the system 100 (for example control device 120, communication unit 130, user interface 110) are illustrated only schematically, with the result that the illustration does not have to permit necessary conclusions to be drawn about a placement of the respective component, about an arrangement in a specific subregion of the vehicle 80 or about other properties of the respective component. It is likewise not absolutely necessary for a system 100 to always have to comprise all of the components illustrated in FIG. 1. The illustration in FIG. 1 thus shows an exemplary embodiment.

The system 100 may be operated in part or in full via the user interface 110 in the vehicle 80. The user interface 110 may comprise one or more multimode user interfaces, in particular user interfaces that are configured for the operation of the vehicle 80 (for example communication, infotainment, air-conditioning, seat adjustment, vehicle settings). The user interface 110 allows the multimode registering of inputs by a user 60, for example via a graphical user interface (for example touchscreen), via conventional operating elements of the vehicle 80 (for example buttons, switches, iDrive controller), through voice control (for example by way of a sensor 168), through scanners (for example for fingerprints, retina) and so forth. The user interface 110 furthermore allows the multimode output of information to a user 60, for example via a graphical display element (for example touchscreen, head-up display 171, instrument panel, central information display or CID), via tactile elements (for example vibration of the steering wheel or of parts of the seat), through voice output via a loudspeaker system present in the vehicle (for example infotainment system) or acoustic signal transmitters (for example gong, beeper) and so forth. The user interface 110 may implement a graphical user interface based on corresponding configuration data and in which display elements and operating elements are displayed, these being able to be used by the user 60 to operate the vehicle 80. In addition or as an alternative, the user interface may involve (further) display and operating elements, for example switches, buttons and displays.

The control device 120 can enter into data communication 140 with (external) back-end components 300 (for example servers or services) via the communication unit 130 and thus communicate for example with back-end servers and/or services. As an alternative or in addition, the control device 120 can enter into data communication with the mobile terminal of a user 60 via the communication unit 130 and use data and/or sensors that are provided by the mobile terminal.

The control device 120 preferably has a data link to a plurality of components via a data bus (not shown). The control device 120 can have a data link for example to the user interface 110, the communication unit 130 and/or a plurality of further components via the data bus (for example CAN bus, FlexRay). The control device 120 can also be configured to receive signals or data from the data bus and/or to transmit signals or data via the data bus.

The system 100 can be configured in particular to determine an operating state of the vehicle 80 and/or a state of one or more occupants in the vehicle 80, preferably based on data drawn from the vehicle 80 via one or more data buses previously mentioned. In preferred embodiments, the system 100 can thus determine for example whether the vehicle 80 is in a particular driving state (for example at a standstill, stop and go, average or high transverse dynamics, average or high speed) or is being operated in a particular mode (for example semiautomated, automated or autonomous; cf. modes described above).

The system 100 may furthermore have one or more back-end components 300 and/or an infrastructure external to the vehicle 80 and that provide one or more resources (for example server, services). The one or more back-end components 300 may be in data communication 140 temporarily or permanently with the control device 120 of the vehicle 80 and/or with the mobile terminal. Resource-intensive processing steps (for example processing natural speech and/or images or video data, voice recognition, processing of large external amounts of data) may preferably be delegated to the external back-end component 300; it would be difficult or even impossible for these resource-intensive processing steps to be performed by the control device 120 in the vehicle 80 and/or by the mobile terminal. Consideration may also be given here to any requirements in terms of computing power, memory capacity, available bandwidth, connection to external data sources and so forth.

The one or more back-end components 300 can be configured in particular to implement cloud-based services and/or applications 312 and to provide a user interface 310 for such services and/or applications to the user interface 110 present in the vehicle 80. The one or more back-end components 300 can be configured in particular in this respect to adjust or change the provision of the user interface 310, preferably in real time, and/or to receive inputs of a user 60 via the user interface 110 and to transmit same to the user interface 310.

Figure 2:
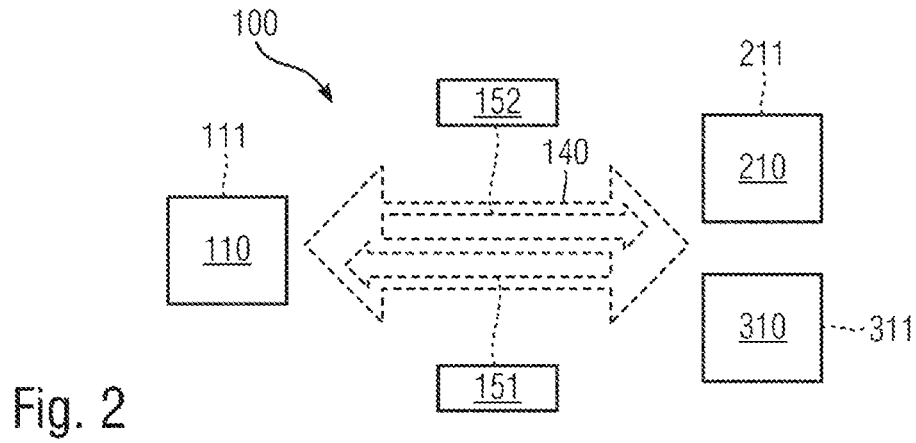
FIG. 2 schematically illustrates functions of a system for coupling a first user interface to a second user interface according to embodiments of the present disclosure.

FIG. 2 schematically illustrates functions of a system 100 for coupling a user interface 210, 310 to a user interface 110 of a vehicle 80 according to embodiments of the present disclosure. As already described, the coupling comprises the connection of a first user interface 210, 310 to a second user interface so that information (for example graphical displays, images, photos, audio, video) displayed by the first user interface 210, 310 or transmitted via the first user interface 210, 310 can be transmitted to the second user interface 110 for the purpose of the display by way of same.

Examples of the (first) user interfaces 210, 310 mentioned here are a user interface 210 of an app that is executed on a mobile terminal 200 (for example smartphone, tablet) of a user 60 of the vehicle 80 and a user interface 310 of a cloud-based application that is executed on one or more back-end components 300.

The first user interface 210, 310 is configured to display one or more elements 211, 311, for example involving textual information, graphics, images, photos, videos, audio information (for example speech output, noise, tones, music) and/or the like. In this context, user interfaces are to be understood as multimedia and include not only pictograms, command buttons, dialog or other elements known from conventional user interfaces but can (also) extend to one of more of the aforementioned and/or further elements.

In a first application example, a user 60 executes an app on their mobile terminal 200, wherein the app implements a first user interface 210 on which one or more elements 211 are displayed. Direct operation of the mobile terminal 200 and/or of the user interface 210 in the vehicle 80 of the user 60 is problematic in particular during travel insofar as it can impair the attention of the user 60 to the driving of the vehicle 80, to the traffic situation and/or other operation of the vehicle 80. The direct use of a mobile terminal by the driver of a vehicle during travel is therefore typically prohibited by law.

In the first application example, the user 60 couples the mobile terminal 200 to a corresponding control device 120, which is provided for connection, for the purpose of being used in the vehicle 80. A connection can be made for example in a wired manner (for example via USB cable) or wirelessly (for example via Bluetooth) and involves a data communication between the mobile terminal 200 and the control device 120 of the vehicle 80, where necessary by means of a communication unit 130. The vehicle 80 furthermore involves a second user interface 110, which is typically configured or provided for operation of the vehicle 80 (for example vehicle operation, operation of the infotainment, communication, information, navigation).

Based on the coupling between the mobile terminal 200 and the control device 120, the user interface 210 is reproduced on the user interface 110 of the vehicle 80 in such a way that an adverse effect on the attention of the user 60 is minimized or completely prevented. The user interface 210 is reproduced by the user interface 110 based on heuristics 151 (also: first heuristics 151 or display heuristics), which map one or more elements 211 of the user interface 210 onto one or more display elements 111 of the user interface 110. The display elements 111 are configured to display the elements 211 on the user interface 110. The heuristics 151 can take several different factors into account in the mapping.

In a second application example, a user 60 couples a first user interface 310 of a cloud-based application that can be executed on one or more back-end components 300 to the second user interface 110 in the vehicle 80. Coupling takes place essentially analogously to the first exemplary embodiment. The type of app or application is in principle not important for the respective application example since the respective user interface 210, 310 or elements 211, 311 is displayed on the user interface 110 or by way of display elements 111 in substantially the same manner. The heuristics 151 for mapping the elements can be applied in the same manner.

The heuristics 151 can involve for example relevance-based heuristics for mapping the one or more elements 211, 311 onto one or more display elements 111, wherein the relevance-based heuristics correlate a relevance of at least one of the one or more elements 211, 311 with one or more display parameters of the display 111. In this case, the relevance-based heuristics are configured not to map or to map, in a modified form, elements 211 that are not relevant or only relevant in a restricted manner to the user 60. By way of example, the user interface 210 can involve elements that are relevant only to the mobile use of the mobile terminal 200 (for example state of charge display, screen orientation) and therefore have no relevance during use in the vehicle for the user 60. The relevance-based heuristics can therefore be configured to leave irrelevant elements 211 out of consideration in the mapping onto display elements 111 in order to reduce the number of displayed elements. For example, it is possible to refrain from displaying the state of charge on the user interface 110 when the mobile terminal 200 is connected to the on-board power supply system of the vehicle 80 and/or the state of charge is sufficiently high so that the operation of the mobile terminal 200 can be maintained. In such a case, the display of the state of charge would not be relevant for the user or would only be slightly relevant and can be faded out. In this case, it holds true that an element 211, 311 that does not have to be mapped onto the user interface 110 or that can be faded out cannot adversely affect the attention of the user 60 in the vehicle 80.

In the same manner, the relevance-based heuristics can be configured to map elements 211 that are particularly relevant to the user 60 in modified form or in a particularly prominent manner. For example, the user interface 210 can involve elements that are relevant in particular to the use of the mobile terminal 200 in the vehicle 80 (for example navigation instructions, vehicle functions or data) and therefore have a particular or particularly high relevance to the user 60 during use in the vehicle. The relevance-based heuristics can therefore be configured to take particularly relevant elements 211 into account in the mapping onto display elements 111 so that they can be perceived (more) easily and/or (more) quickly, for example in order to direct the attention of the user 60 directly and easily to the relevant display elements 111. For example, it is possible to provide a prominent (for example magnified, highlighted in color) display of a directional arrow of a navigation app on the user interface 110. In such a case, the user 60 could possibly perceive the directional indication (more) easily and/or (more) quickly. In particular, provision can be made for elements 211, 311 that relate to the driving operation of the vehicle to be displayed as display elements 111 at a prominent location (for example head-up display) and/or in an appropriate (modified) form.

The heuristics 151 can furthermore involve for example dynamics-based heuristics for transferring the one or more elements 211, 311 to one or more display elements 111, wherein the dynamics-based heuristics correlate display dynamics of at least one of the one or more elements 211, 311 with one or more display parameters of the image. The dynamics-based heuristics can for this purpose take into account in particular dynamics of the display of elements

211, 311 and/or other dynamics, for example relating to a driving situation of the vehicle 80.

In this case, the dynamics-based heuristics can be configured to map dynamics of the one or more elements 211, 311 in a "non-dynamic" or "less" dynamic manner (for example in a static manner) or in a simplified form (for example with reduced dynamics). For example, the first user interface 210 can involve elements having high dynamics (for example videos, animations) that can greatly affect the attention of the user 60 of the vehicle 80 when these are displayed 1:1 on the second user interface 110. The dynamics-based heuristics can therefore be configured to map elements 211 with high dynamics onto display elements 111 with low dynamics in order to reduce the dynamics of the display overall. For example, it is possible to reduce a video or an animation to a static (for example individual image, placeholder) or virtually static (for example few individual images) display. Instead of the video or the animation (for example element 211, 311), only one or a few individual images, for example in the form of a still image, thumbnail or photo (for example display element 111) is then displayed on the second user interface 110. The user 60 is distracted only minimally or not distracted at all by the display of the now static or virtually static display element 111 and can thus concentrate on driving the vehicle. In this case, the dynamics-based heuristics can have a positive "training effect" beyond the immediate application case, namely when the user 60, through the use of the system 100, is already used to the fact that no information is able to be "missed" since display during travel fails to appear anyway and regularly "checking back" is not necessary or useful at all. The dynamics-based heuristics can also be configured to reduce the dynamics of further mobile or dynamic elements, for example by reducing or eliminating typical animations and/or animations serving only for obviousness (for example opening or closing windows, dialogs; screen layout, scrolling, etc.).

In one example, a user 60 can request (new) content or update already displayed content, for example by activating an operating element (for example pressing a button, voice input). Content or an update can involve for example a (new) still image of a video (for example live football transmission). An update rate, how often an update can or may be requested, can preferably be adapted based on one or more environmental parameters or a "permitted distraction" allowed by the system 100. A permitted distraction can be quantified or influenced in a known manner. Document DE 10 2013 221 867 discloses for example how a fidelity and/or latency of a system can be modified artificially in order to thus minimize driver distraction. Document DE 10 2018 129 801 discloses for example a method by way of which a permissible distraction can be specified situationally, based on which further systems in a vehicle can be adapted.

In addition or as an alternative, the dynamics-based heuristics can be configured to take into account a current driving state of the vehicle 80. In the respective context, it may be important for the evaluation of a distraction of the user 60 to register and to take into account a current driving state of the vehicle 80. A user 60 at a standstill or in stop and go traffic thus typically requires only a minimum or very low degree of attention to safely drive the vehicle 80 while a relatively high degree of attention is necessary in the case of heavy urban traffic, routes with lots of bends or at higher speeds. The same applies to various levels of automated or autonomous driving, wherein a user 60 has to pay a different level of attention to the vehicle depending on the level. The system 100 can register a respective driving state or driving mode and adapt the heuristics to the driving state. In particular, information can be output in a delayed manner depending on the driving state as soon as a degree of attention required for the respective driving state reaches or falls below a particular level. When the level of attention required has dropped as a result of the driving state so far that a distraction of the user 60 by the display of the display elements 111 on the second user interface 110 can be considered as non-critical, the system 100 can trigger a display. It is thus possible, for example in the event of congestion (for example standstill of the vehicle 80), to read out news to the user 60 or to display videos that have previously been delayed or faded out based on the driving state.

The heuristics 151 can also involve for example content-based heuristics in order to determine context-sensitive semantics of elements 211, 311 within the context of the current use of the respective user interface 210, 310 by the user 60. In this case, the content-based heuristics are configured to filter out content that is inherently directed to the attention of the user 60 and/or that is targeted at the particular degree of attention of the user (for example advertisements, infomercials, advertising animations, optically edited elements for capturing the gaze).

The heuristics 151 can also involve for example parameter-based heuristics for transferring one or more parameters of the first user interface 210, 310 to one or more parameters of the second user interface 110. In this case, a series of parameters (for example screen size, resolution, orientation, text size, pictograms, menus) of the first and second user interfaces can be coordinated with one another so that a correct display and/or transparent operation are made possible.

Further heuristics (as part of the first heuristics 151) can involve for example role-based heuristics, which take into account the role of a user 60 (for example as driver, front-seat passenger, passenger) and thus the requirements of the attention of the user 60 for driving the vehicle 80. The role-based heuristics can, for example, draw conclusions about the role of the user 60 based on an operating component of the vehicle 80 used by the user 60, for example when the user 60 uses a user interface that cannot be used by the driver of the vehicle 80 (for example rear-seat entertainment).

Further heuristics can involve in particular personal capabilities of or demands on the user 60 in the role of the driver. Capabilities or demands can relate for example to the vision of the user 60, the hearing, reaction capacity and other characteristics, including age, sex or the like. In this case, certain capabilities can also be relevant in a context-dependent manner, for example vision at dusk or at night, color-blindness, etc., with such capabilities preferably being registered manually or statistically and being updated regularly or continuously (for example training, sampling, measuring). It is also possible to perform a correlation between several users 60 (for example simultaneous use or time-offset use). In this case, personalized heuristics can detect and take into account the extent to which individual people are distracted by individual elements, with the fact that different users 60 are distracted to different extents by the same elements being mapped in particular. This can make it possible for example to map a reduced distraction of older, more experienced users 60 with respect to multimedia content in comparison to an increased distraction of younger, less experienced users 60. In the same way, increased distraction of the former due to poor light in comparison to a lower distraction of the latter can likewise be mapped. This makes it possible to individually adapt the display of individual elements to respective users 60 and the characteristics or roles thereof. Further factors that may be relevant to the personal heuristics involve for example a volume of audio displays, display of different brightnesses, a respective privacy (for example with password input) and so forth. A further aspect for personal heuristics is taking into account for a second user 60 (for example driver) display elements that are directed at a first user 60 (for example front-seat passenger).

According to the present disclosure, heuristics preferably involve predetermined, learned and/or tagged metainformation regarding contents of applications (for example mobile apps, web applications, cloud applications).

With respect to the example of voice interactions, heuristics can preferably reproduce the following interactions:

- "Show the main page (again)"
- "Show me the page {<screen name>; <similar screen names>}"
- "Show me the page with <content>" (search in the screens for the described content)
- "Confirm that" or "Confirm"
- "Check <content>"; "No, the check after"
- "Send that" or "Send"
- "Go one page back"
- "Show me <content> in detail"
- "Update"/"Update that"/"Update the image/video" etc.
- "Insert text above/below"/"Insert the following text under <content> (and send)"
- "Activate the text box"/"Activate the text box <content>"

Basic screen content categories preferably covered by heuristics involve one or more of:

- text area for strings
- text area for numbers
- input region
- password input region/login region
- input/output fields for date information, time information, calendar, etc.
- static graphical area
- dynamic graphical area
- "captions"
- tables –> tables column name, row entries, possibly also additional note: "Table comprises x rows..."
- headings
- text identification in images, possibly replacement by text
- content identification of images (for example "2 faces", "dog", etc.)
- "background graphics" with no use in terms of content
- Buttons
- button label
- typical graphics:
  - "Next", "Back", "Home"
  - shopping trolley
  - "OK", "Continue", "End"
  - search
  - scroll ("up", "down", "left", "right")
  - tab
- touch gestures
  - swipe
  - zoom In addition, for example in order to increase a readability and/or detectability of graphical elements, display parameters can be adjusted (for example by means of contrast adjustments, brightness, color changes, selective color changes of text on the background).

A functionality, that is to say whether an element in an application is "clickable" or activatable in another way (for example the presence of a zoom or swipe region), can be learned in an automated manner. An exemplary implementation of this is as follows:
system is loaded into a (virtual) machine
wait until there is no change at the output, and/or
identify image elements that occasionally/regularly/continuously change even without input.
randomly carry out input actions:
Delta observation:
What has changed?
Is there an entirely new unknown or known screen content?
general: similarity tree between all outputs depending on input and clustering.
additionally: use of heuristics of the typical operation, for example in different applications (for example iOS, Android Variant X, web application).

The system 100 is preferably configured to adapt one or more heuristics at regular intervals, continuously and/or where necessary, based on a determined effectiveness and/or current or averaged distraction of a user 60. In this case, a behavior of one or more users 60 can be registered and evaluated (for example by means of an interior camera, eye tracking or a comparable or similar sensor system) in order to quantify a current distraction. Based on such a quantification, various heuristics can then be applied and assessed according to one or more criteria (for example effectiveness). Over time, various heuristics can then be adjusted, possibly several times, and one or more optimized or otherwise preferred heuristics can be selected and applied for one or more users 60. One or more heuristics can involve in particular the fact that a distraction of one or more users 60 exceeds a maximum value and a further display of content and/or transmission of inputs is suppressed.

The coupling also makes it possible that inputs 113 (for example via touchscreen, gestures, voice inputs, by means of various operating elements) performed by the user 60 of the vehicle 80 by means of the second user interface 110 are transmitted to the first user interface 210, 310 for the purpose of processing thereby, preferably in the form of an input image 213, 313. According to the invention, such a coupling allows different applications to be operated via the second user interface 110 (which is implemented for example by way of a control device 120 in a vehicle 80), wherein the applications are provided originally for operation via the first interface (which is implemented for example by way of a mobile terminal 200 or one or more back-end components 300). In this case the second interface 110 is not directly implemented by the mobile terminal 200 or the one or more back-end components 300 (for example in the case of cloud-based applications), that is to say a respective application is not provided for the operation by means of the second interface. The invention also makes provision for the display and/or the inputs to be adjusted in such a way that the attention of the user 60 of the vehicle 80 (for example to the traffic, the driving of the vehicle and/or the operation of the vehicle) is not adversely affected or is only minimally affected and/or that various modalities of the input in the vehicle 80 are transmitted correctly or usefully in semantic terms to the first user interface.

An input image 213, 313 is determined based on one or more inputs 113 of the user 60 (for example by the second user interface 110 or by means of further operating elements of the vehicle 80) and based on second heuristics 152 (also: input heuristics). The second heuristics 152 are configured to map one or more inputs 113 of the user 60 onto an input image 213, 313 independently of an input modality, which can then be transmitted to the first user interface 210, 310.

The second heuristics 152 can involve in particular input-modal heuristics. The input-modal heuristics are configured to take different input modalities into account in the mapping of the one or more inputs 113 onto the input image 213, 313. Different input modalities are present for example when the user 60 effects inputs 113 not only based on the second user interface 110 (for example by tapping on a touchscreen) but uses alternative and/or additional components for the input. Such components can involve for example one or more of the following: iDrive controller (for example rotary/push-button control) or switches in the vehicle 80, gesture control, voice inputs, facial expressions, head movements and so forth. For example, a user 60 can position a cursor on a text box for inputting a destination address via gesture control (for example pointing) and subsequently dictate a destination address via voice input. The user 60 can finally confirm the input by nodding their head. These multimode inputs are mapped onto an input image accordingly by the input-modal heuristics, for example: moving a cursor analogously to swiping with the finger over a user interface or pointing with a mouse cursor, text inputs and clicking or touching a button. As a result, various modalities of the first user interface 110 and/or the vehicle 80 are mapped onto input modalities corresponding to the first user interface 210, 310 in a transparent manner (that is to say without requiring further functionality or individual adjustments to the second user interface).

Figure 3:
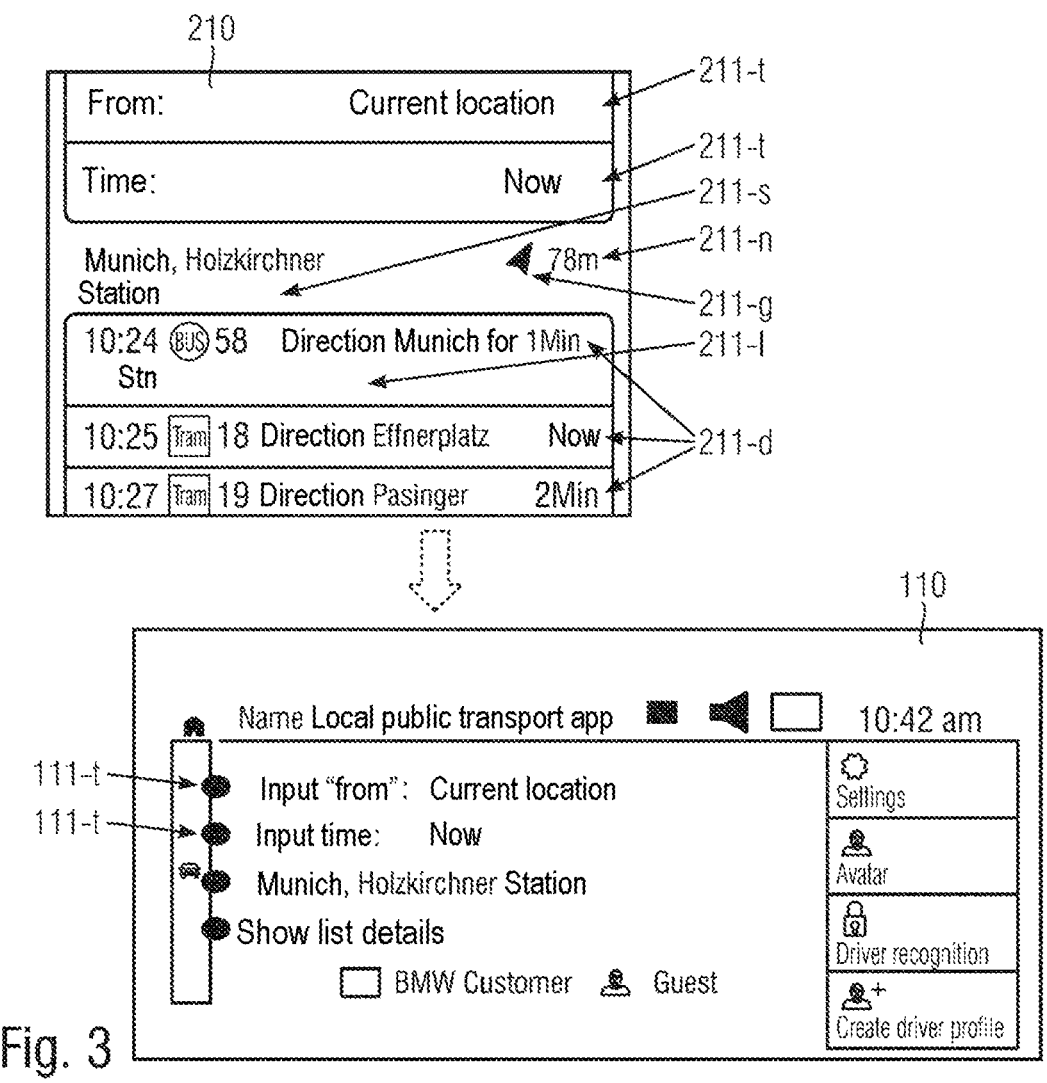
FIG. 3 illustrates by way of example the display of elements of a first user interface on a second user interface according to embodiments of the present disclosure.

FIG. 3 illustrates by way of example the display of elements 211-t, 211-s, 211-n, etc. of a first user interface 210 on a second user interface 110 according to embodiments of the present disclosure. By way of example, in this case a coupling is described based on a user interface 210 of a mobile terminal 200. A web application or the user interface 310 of a cloud-based application is coupled in essentially the same way.

The first user interface 210 contains several elements, for example text input boxes 211-t, static text boxes 211-s, numerical elements 211-n, graphical elements 211-g, (scrollable and possibly static) list elements 211-l and dynamic elements 211-d. The present case deals with a request for connections in local public transport based on a current location and a current time, wherein the elements are based on corresponding text input boxes 211-t. The text input boxes are displayed on the second user interface 110 by means of corresponding text input boxes 111-t, the inputs of which are transmitted to the user interface 210 as described above. Further elements are displayed, as illustrated, wherein overloading of the display with too much information is prevented. In this case, the user 60 can call up a successive display by means of one or more voice inputs (for example "Show further elements in the list" or "Read out the search results"). In addition, a display on a central information display screen that is magnified in comparison to the app is possible, which enables more rapid registration of the content by the user.

Figure 4:
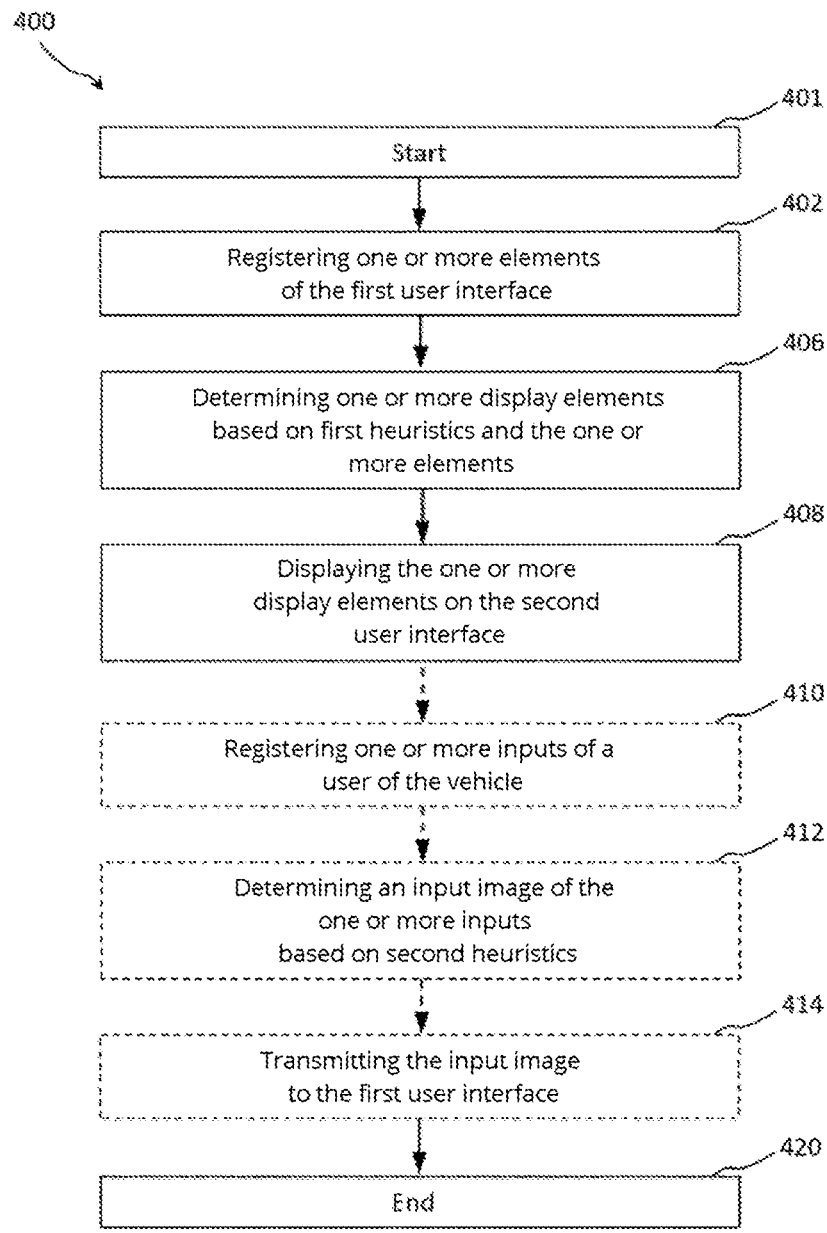
FIG. 4 shows a flowchart of a method for coupling a first user interface to a second user interface according to embodiments of the present disclosure.

FIG. 4 shows a flowchart of a method 400 for coupling a user interface 210, 310 to a user interface 110 of a vehicle according to embodiments of the present disclosure. The method 400 for coupling a first user interface 210, 310 to a second user interface 110 begins with step 401. The first user interface 210, 310 is preferably implemented by way of a mobile terminal 200 or by way of one or more back-end components 300. The second user interface 110 is preferably implemented by way of a control device 120 of a vehicle 80. In step 402, one or more elements 211, 311 of the first user interface 210, 310 are registered. In step 406, one or more display elements 111 are determined, based on first heuristics 151 and the one or more elements 211, 311. The one or more display elements 111 are configured to depict at least some of the one or more elements 211, 311. In step 408, the one or more display elements 111 are displayed on the second user interface 110. The method ends with step 420.

Although the invention has been explained and illustrated in more detail through preferred exemplary embodiments, the invention is not restricted by the disclosed examples and other variations may be derived therefrom by a person skilled in the art without departing from the scope of protection of the invention. It is therefore clear that there are a multiplicity of variation options. It is likewise clear that embodiments mentioned by way of example actually only constitute examples that should not be understood in any way as limiting for instance the scope of protection, the application options or the configuration of the invention. On the contrary, the above description and the description of the figures give a person skilled in the art the ability to implement the exemplary embodiments in specific terms, wherein a person skilled in the art with knowledge of the disclosed concept of the invention may make numerous modifications, for example with regard to the function or the arrangement of individual elements mentioned in an exemplary embodiment, without departing from the scope of protection defined by the claims and their legal counterparts, such as for instance further explanations in the description.

What is claimed is:

1. A method for coupling a first user interface to a second user interface, wherein the first user interface is implemented by way of a mobile terminal or by way of one or more back-end components and the second user interface is implemented by way of a control device of a vehicle, the method comprising:

registering one or more elements of the first user interface;

determining one or more display elements based on first heuristics and the one or more elements, wherein the one or more display elements are configured to depict at least some of the one or more elements;

displaying the one or more display elements on the second user interface;

registering one or more inputs of a user of the vehicle;

determining an input image of the one or more inputs based on second heuristics;

transmitting the input image to the first user interface;

repeatedly at regular intervals, continuously, or when required:

registering one or more behavior parameters, which characterize a behavior of the user of the vehicle, by directly monitoring the user of the vehicle via an optical sensor; and determining one or more attention parameters, which characterize a degree of attention of the user of the vehicle relating to the operation of the vehicle, based on the behavior parameters; and adjusting the first and/or second heuristics based on the determined one or more attention parameters, wherein the first heuristics comprise personal capabilities of the user of the vehicle, wherein the first heuristics further comprise relevance-based heuristics for transferring the one or more elements to the one or more display elements, wherein the relevance-based heuristics correlate a relevance of at least one of the one or more elements with one or more display parameters of the depiction, wherein the relevance-based heuristics take into account a current relevance of the one or more elements for the user of the vehicle, wherein the current relevance of an element of the one or more elements is determined based on whether the element is usable by the user of the vehicle for a purpose related to the operation of the vehicle, and wherein a first element of the one or more elements that is relevant only to mobile use of the mobile terminal is prevented from being displayed on the one or more display elements according to the relevance-based heuristics.

2. The method according to claim 1, wherein the first heuristics further comprise:
dynamics-based heuristics for transferring the one or more elements to one or more display elements,
wherein the dynamics-based heuristics correlate display dynamics of at least one of the one or more elements with one or more display parameters of the depiction, and
wherein the dynamics-based heuristics take into account a current driving state of the vehicle.

3. The method according to claim 1, wherein the first heuristics further comprise:
parameter-based heuristics for transferring one or more parameters of the first user interface to one or more parameters of the second user interface, and
wherein the parameter-based heuristics take into account generic depiction rules of the display of the one or more elements on the second user interface.

4. The method according to claim 1, wherein the second heuristics further comprise:
input-modal heuristics for depicting the one or more inputs of the user on input modalities of the first user interface.

5. The method according to claim 1, wherein
the steps of registering one or more inputs, of determining the input image, and of transmitting the input image to the first user interface are carried out in real time.

6. The method according to claim 1, wherein
the steps of registering the one or more elements, of determining one or more display elements and of displaying the one or more display elements on the second user interface are carried out in real time.

7. A system for providing one or more users of a vehicle with information, the system comprising:
a control device; and/or
one or more back-end components; wherein
the control device and/or the one or more back-end components are configured to couple a first user interface to a second user interface, wherein the first user interface is implemented by way of a mobile terminal or by way of the one or more back-end components and the second user interface is implemented by way of the control device of a vehicle, wherein the coupling operates to:
register one or more elements of the first user interface;
determine one or more display elements based on first heuristics and the one or more elements, wherein the one or more display elements are configured to depict at least some of the one or more elements;
display the one or more display elements on the second user interface;
register one or more inputs of a user of the vehicle;
determine an input image of the one or more inputs based on second heuristics;
transmit the input image to the first user interface;
repeatedly at regular intervals, continuously, or when required:
register one or more behavior parameters, which characterize a behavior of the user of the vehicle, by directly monitoring the user of the vehicle via an optical sensor; and
determine one or more attention parameters, which characterize a degree of attention of the user of the vehicle relating to the operation of the vehicle, based on the behavior parameters; and
adjust the first and/or second heuristics based on the determined one or more attention parameters,
wherein the first heuristics comprise personal capabilities of the user of the vehicle,
wherein the first heuristics further comprise relevance-based heuristics for transferring the one or more elements to the one or more display elements,
wherein the relevance-based heuristics correlate a relevance of at least one of the one or more elements with one or more display parameters of the depiction,
wherein the relevance-based heuristics take into account a current relevance of the one or more elements for the user of the vehicle,
wherein the current relevance of an element of the one or more elements is determined based on whether the element is usable by the user of the vehicle for a purpose related to the operation of the vehicle, and
wherein a first element of the one or more elements that is relevant only to mobile use of the mobile terminal is prevented from being displayed on the one or more display elements according to the relevance-based heuristics.

8. A vehicle, comprising:
a control device, wherein
the control device is configured to couple a first user interface to a second user interface, wherein the first user interface is implemented by way of a mobile terminal or by way of one or more back-end components and the second user interface is implemented by way of the control device,
the control device operating to:
register one or more elements of the first user interface;
determine one or more display elements based on first heuristics and the one or more elements, wherein the one or more display elements are configured to depict at least some of the one or more elements;
display the one or more display elements on the second user interface;
register one or more inputs of a user of the vehicle;
determine an input image of the one or more inputs based on second heuristics;
transmit the input image to the first user interface;
repeatedly at regular intervals, continuously, or when required:
register one or more behavior parameters, which characterize a behavior of the user of the vehicle, by directly monitoring the user of the vehicle via an optical sensor; and
determine one or more attention parameters, which characterize a degree of attention of the user of the vehicle relating to the operation of the vehicle, based on the behavior parameters; and
adjust the first and/or second heuristics based on the determined one or more attention parameters,
wherein the first heuristics comprise personal capabilities of the user of the vehicle,
wherein the first heuristics further comprise relevance-based heuristics for transferring the one or more elements to the one or more display elements, wherein the relevance-based heuristics correlate a relevance of at least one of the one or more elements with one or more display parameters of the depiction, wherein the relevance-based heuristics take into account a current relevance of the one or more elements for the user of the vehicle, wherein the current relevance of an element of the one or more elements is determined based on whether the element is usable by the user of the vehicle for a purpose related to the operation of the vehicle, and wherein a first element of the one or more elements that is relevant only to mobile use of the mobile terminal is prevented from being displayed on the one or more display elements according to the relevance-based heuristics.

* * * * *